US006233588B1

(12) United States Patent
Marchoili et al.

(10) Patent No.: US 6,233,588 B1
(45) Date of Patent: May 15, 2001

(54) SYSTEM FOR SECURITY ACCESS CONTROL IN MULTIPLE REGIONS

(75) Inventors: John Marchoili, Fairport; John Neilsen, Macedon; Michael Regelski, Rochester; Rudy Prokupets, Rochester; David Zientara, Rochester; Robert Rozwod, Victor, all of NY (US)

(73) Assignee: Lenel Systems International, Inc., Pittsford, NJ (US)

( * ) Notice: Subject to any disclaimer, the term of this patent is extended or adjusted under 35 U.S.C. 154(b) by 0 days.

(21) Appl. No.: 09/203,455

(22) Filed: Dec. 2, 1998

(51) Int. Cl.[7] ............................ G06F 12/00; G06F 11/30

(52) U.S. Cl. .......................... 707/200; 707/203; 713/200; 713/201

(58) Field of Search .................................... 707/200, 203; 713/200, 201

(56) References Cited

U.S. PATENT DOCUMENTS

| | | | | |
|---|---|---|---|---|
| Re. 35,336 | | 9/1996 | Ulch et al. . | |
| 4,216,375 | | 8/1980 | Ulch et al. . | |
| 4,218,690 | | 8/1980 | Ulch et al. . | |
| 4,581,634 | * | 4/1986 | Williams | 348/156 |
| 4,714,995 | | 12/1987 | Materna et al. . | |
| 4,721,954 | | 1/1988 | Mauch . | |
| 4,816,658 | * | 3/1989 | Khandwala et al. | 235/382 |
| 4,837,568 | * | 6/1989 | Snaper | 340/10 |
| 4,839,640 | | 6/1989 | Ozer et al. . | |
| 4,962,473 | * | 10/1990 | Crain | 340/473 |
| 4,998,279 | | 3/1991 | Weiss . | |
| 5,097,505 | | 3/1992 | Weiss . | |
| 5,210,873 | | 5/1993 | Gay et al. . | |
| 5,475,375 | * | 12/1995 | Barret et al. | 340/5 |
| 5,475,378 | | 12/1995 | Kaarsoo et al. . | |
| 5,544,062 | | 8/1996 | Johnston, Jr. . | |
| 5,614,890 | | 3/1997 | Fox . | |
| 5,629,981 | * | 5/1997 | Nerlikar | 713/168 |
| 5,654,696 | | 8/1997 | Barrett et al. . | |
| 5,680,328 | | 10/1997 | Skorupski et al. . | |
| 5,682,142 | | 10/1997 | Loosmore et al. . | |
| 5,870,733 | * | 2/1999 | Bass et al. | 707/2 |
| 5,923,264 | * | 7/1999 | Lavelle et al. | 340/10 |
| 5,960,174 | * | 9/1999 | Dew | 709/208 |
| 6,064,723 | * | 5/2000 | Cohn et al. | 379/88.14 |

* cited by examiner

*Primary Examiner*—Thomas Black
*Assistant Examiner*—Frantz Coby
(74) *Attorney, Agent, or Firm*—Kenneth J. Lukacher

(57) ABSTRACT

A system for controlling access in multiple regions is provided in which each region comprises one or more sites having building areas to which access is controlled. The system includes multiple regional databases, where each regional database is associated with one of the regions, and a master database storing system information, cardholder information and access control information. A master computer system is coupled to the master database, and a regional computer system, capable of data communication to the master computer system, is coupled to each of the regional databases. Initially, the master computer system downloads the system information and cardholder information from the master database to each of the regional databases, and each regional computer system uploads the access control information from its regional database to the master database to provide the stored access control information for the region at the master database. Each region operates independently of the master database, and can change (add, modify, or delete) access control information and cardholder information stored in its regional database. The regional computer system of each region periodically uploads to the master database any changes in the access control information of the regional database, and any changes in the cardholder information of the regional database. The master computer system periodically downloads from the master database to each regional database any changes in cardholder information made by other regions. Thus, the system, cardholder, and access control information stored in the master database is maintained identical to the corresponding information at each of the regional databases, and cardholder information changes made at each region are distributed to other regions through the master database.

55 Claims, 6 Drawing Sheets

SYSTEM FOR SECURITY ACCESS CONTROL IN MULTIPLE REGIONS

FIELD OF THE INVENTION

The present invention relates to a system (and method) for providing security access control to areas in one or more buildings, and particularly to a system for providing security access control and management of badges (access enabling devices or codes, called badges herein, which are assigned to personnel) over multiple geographic regions. This invention is especially suitable for providing a master database which maintains a repository for the information used by each region for security access control and badge management, while allowing each region to operate independently of the master database in accordance with a regional database. The system may be applied for security access control for a company, university, or any other institution or entity having areas where access control is needed.

BACKGROUND OF THE INVENTION

Conventional access control systems provide security to areas of a building by utilizing readers associated with locking mechanisms to doors which control entry to such areas. Persons, such as employees, are provided with security badges having data accessible by the reader. Access decisions are made in accordance with security information stored at a central database in response to badge data read from the readers with or without a keypad entered pin number, or access decisions may be made by other databases associated with the readers. Examples of prior access control systems are described in U.S. Pat. Nos. 4,839,640, and 4,218,690.

Many companies today have sites in different geographic regions, such as cities, states, or countries. To provide access control in each of the regions, early access control systems had a master computer system with a single central database containing all security information for the system, and each region used that central database in making access control decisions. Each of the regions was thus dependent on the central database, and if communication between the master computer system and a region was ever lost, access control in the region was severely degraded. More recently, each of the regions has their own system for security access control to areas of buildings at sites within that region, which may also provide managing of badges worn by personnel in the region. However, badges used in one region are often useless in other regions, since it is unlikely that badges have been associated with the security access systems of other regions. This is especially a problem for employees who work in more than one region, or travel to sites in other regions. Often such employees must be issued multiple badges in which each badge provides access to areas within a particular region. Thus, it would be desirable to provide access control system which enables a single badge to be used in multiple regions. However, as each region needs the capability to administer security access and badging for its own region, it is further desirable to provide such an access control system which allows each region to operate independently. Such independent operation is typically facilitated by each region utilizing its own database to maintain information used by the security access system of the region.

Further, information needed for managing badges in one region is unavailable to any other region. This may lead to security problems when changes in information made at one region affect access decisions to the areas which the personnel may enter or exit from. Thus, for example, if an employee is terminated in one region, the employee may be able to use one or more of his or her badges to access areas within other regions in which access had been established.

In addition, by using separate regional security access control systems, there is no readily available means for the headquarters (or main corporate office) of a company to monitor the operation of each region. Thus, the headquarters of a company typically cannot determine the status of security at any particular region or site. Furthermore, it is difficult for the headquarters to monitor the information being used to manage the badges of personnel in different regions, and to establish uniform procedures for generating badges in different regions.

SUMMARY OF THE INVENTION

It is the principal object of the present invention to provide an improved access control system which has a single master database for storing information used by multiple regions to provide security access control and management of badges in the region, while allowing each region to operate independent of the master database in accordance with a regional database.

Another object of the present invention is to provide an improved access control system which allows changes made at each region in information for managing badges to be distributed to a master database and to each other region.

A further object of the present invention is to provide an improved access control system having multiple regions in which each region has a regional database having information which is maintained identical to a master database.

A still further object of the present invention is to provide an improved access control system having multiple regions in which badges can be used in more than one region.

It is yet a further object of the present invention to provide an improved access control system which has one or more portable badging systems.

It is still another object of the present invention to provide an improved access control system having multiple regions in which each region has a regional database and when a change in information occurs in the regional database affecting access control decisions in the region, security information reflecting this change is automatically distributed to access control equipment in the region.

Briefly described, the system embodying the present invention includes multiple regions, in which each region comprises one or more sites having areas to which access is controlled, multiple regional databases, where each regional database is associated with one of the regions, and a master database for storing system information, cardholder information for the system, and access control information for each region. A master computer system is coupled to the master database, while a regional computer system, capable of data communication with the master computer system via a network, is each coupled to each regional database. The master computer system downloads the system information and cardholder information from the master database to each regional database, and each regional computer system uploads (or replicates) to the master database access control information from their respective regional database to provide the stored access control information at the master database for that region. The access control information for each region stored at its regional database is thus initially identical to the access control information for the region stored at the master database. Similarly, the cardholder information stored for each region at its regional database is initially identical to the cardholder information at the master database.

Each region operates independent of the master database in accordance with their respective regional database, and can change the cardholder information or access control information stored in their respective regional database. More specifically, each region manages badges worn by personnel to access areas in accordance with the cardholder information stored at the regional database of the region, and administers access control of the region in accordance with the access control information stored at the regional database of the region. The system information cannot be changed by a region at a regional database, since it represents information for maintaining uniformity in the operation of each region, while enabling each region to operate independently of the master database in changing cardholder or access control information stored at its regional database.

Periodically, the regional computer system of each region connects to the master computer system and any additions, modifications, or deletions in the access control information of the region's regional database are uploaded from the regional database to the master database. Also periodically, the regional computer system of each region connects to the master computer system and any additions, modifications, or deletions in the cardholder information of the region's regional database are uploaded to the master database. The master computer system then downloads from the master database to each of the regional databases cardholder information in accordance with any additions, modifications, or deletions in the cardholder information uploaded to the master database from other regional databases (or made at the master database), thereby distributing changes in cardholder information to the regions. Thus, the access control information and cardholder information stored at the regional databases are maintained identical to its corresponding information stored at the master database. Although system information cannot be changed at a regional database, system information may be also periodically downloaded from the master database to the regional database to update each region with changes in system information made at the master database. The periodic upload and download by each region may occur in one or more communication sessions between the region computer system of the region and the master computer system.

The cardholder information and access control information in the system each utilize unique identifiers to different parts of the cardholder information and access control information, respectively. The system information downloaded to each region comprises ranges of unused identifiers allocated to each of the regional databases for enabling each region to generate additional cardholder information and access control information in the regional database, which facilitates the independent operation of each region from the master database, and provides enhanced flexibility controlling access throughout integrated facilities.

DETAILED DESCRIPTION OF THE DRAWINGS

The foregoing objects, features and advantages of the invention will become more apparent from a reading of the following description in connection with the accompanying drawings in which.

DETAILED DESCRIPTION OF THE INVENTION

The access control system of the present invention includes multiple regions in which each region has one or more sites with buildings having areas in which access is controlled and monitored. Each of these regions may be a geographic region, such as cities, states, countries, or continents. In each region, card readers are associated with each area where access (entry or exit) is controlled to read information from badges worn by personnel. Information read from a badge by each card reader and other verifying information which may be provided by a cardholder to the reader, such as a pin number, is compared against stored records of a database which may be located in a central controller, one of several access controllers, or a card reader, to determine if entry to or exit from an area is granted to the badge holder. Each region further provides badging for personnel in that badges used in the system may be added, modified or deleted. Each region in the system operates independent of the other regions in providing badging and controlling access in accordance with a regional database for the region, while a master database provides a repository for information used by the regions in the system. The present invention is not limited to the use of any particular type of access control equipment in a region, so long as each region has a regional database which provides a repository for information used by the region.

Figure 1:
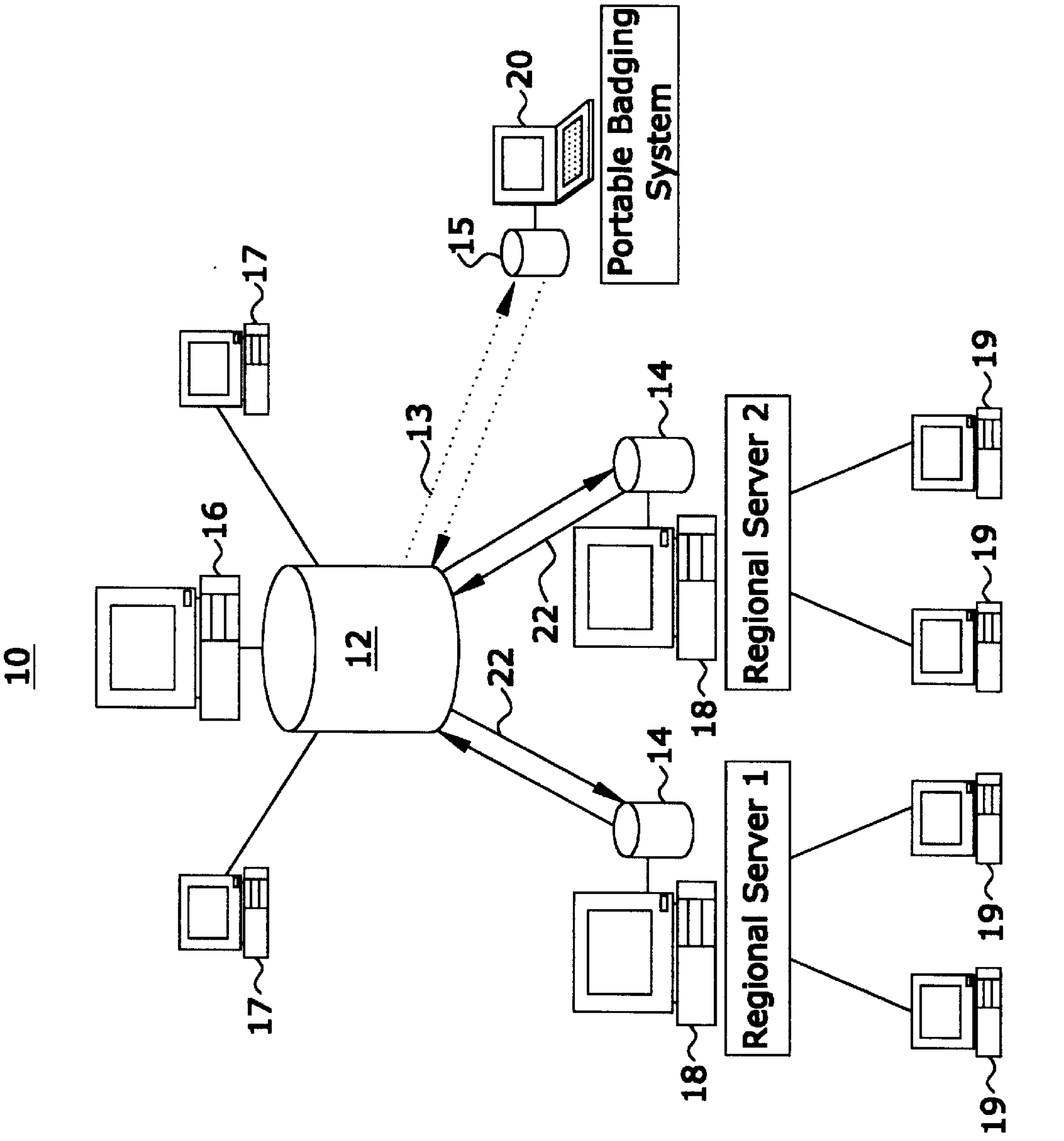
FIG. 1 is a block diagram of the system in accordance with the present invention.

Referring to FIG. 1, the access control system 10 of the present invention is shown having a master database 12 and multiple regional databases 14, where each regional database is associated with a different geographic region. A master computer system 16, such as a computer server (called hereinafter the master server), has a memory storage unit storing the master database 12. Each of the regional databases 14 is stored on a memory storage unit of a regional computer system 18, such as a computer server (called hereinafter the regional server). For example, the memory storage units of the master server 16 and each regional server 18 may be a hard drive. Although two regional servers 18 and databases 14 are illustrated in FIG. 1, any number of regional servers and databases may be included in system 10.

A communication network in system 10 provides data communication between the master server 16 and each of the regional servers 18, and hence between their respective databases 12 and 14. The master server 16 and regional server 18 each have communication interfaces, such as an Ethernet network card, through which such data communication can take place. The master server 16 and regional servers 18 each operate in accordance with software which can enable the transfer of data, such as files or records, between the master database 12 and regional databases 14, respectively. This software, for example, may be WindowsNT sold by Microsoft, but may be any other type of software enabling such transfer of data and files. The communication network may be WAN, Internet-based, or utilize any other type of wide area network. The communication protocol in providing network communication may be, for example, TCP/IP (Internet) protocol, or other WAN protocols may be used. Other types of communication networks may also be used, such as a telecommunication network, or LAN. The communication network in FIG. 1 is bidirectional between the master server 16 and regional servers 18 as illustrated by arrows 22. Connections between the master server 16 and each regional server 18 are established when data communication is required; however, permanent connections may alternatively be provided.

Master computer workstations 17, which may represent computer-based systems, can each log onto the master server 16 to allow users to interface with the master server 16 and the master database 12. The master computer workstation can also log into a regional server, if the user of the workstation has permission. Similarly, regional computer workstations 19 may represent computer-based systems. Each regional computer workstation 19 can log into the regional server 18 to which the workstation is associated with to allow users to interface with the regional server and the regional database 14. A regional computer workstation 19 can also log into other regional servers or the master server, if the user of the workstation has permission. The regional workstations will be discussed in further detail in connection with FIG. 2.

Figure 2:
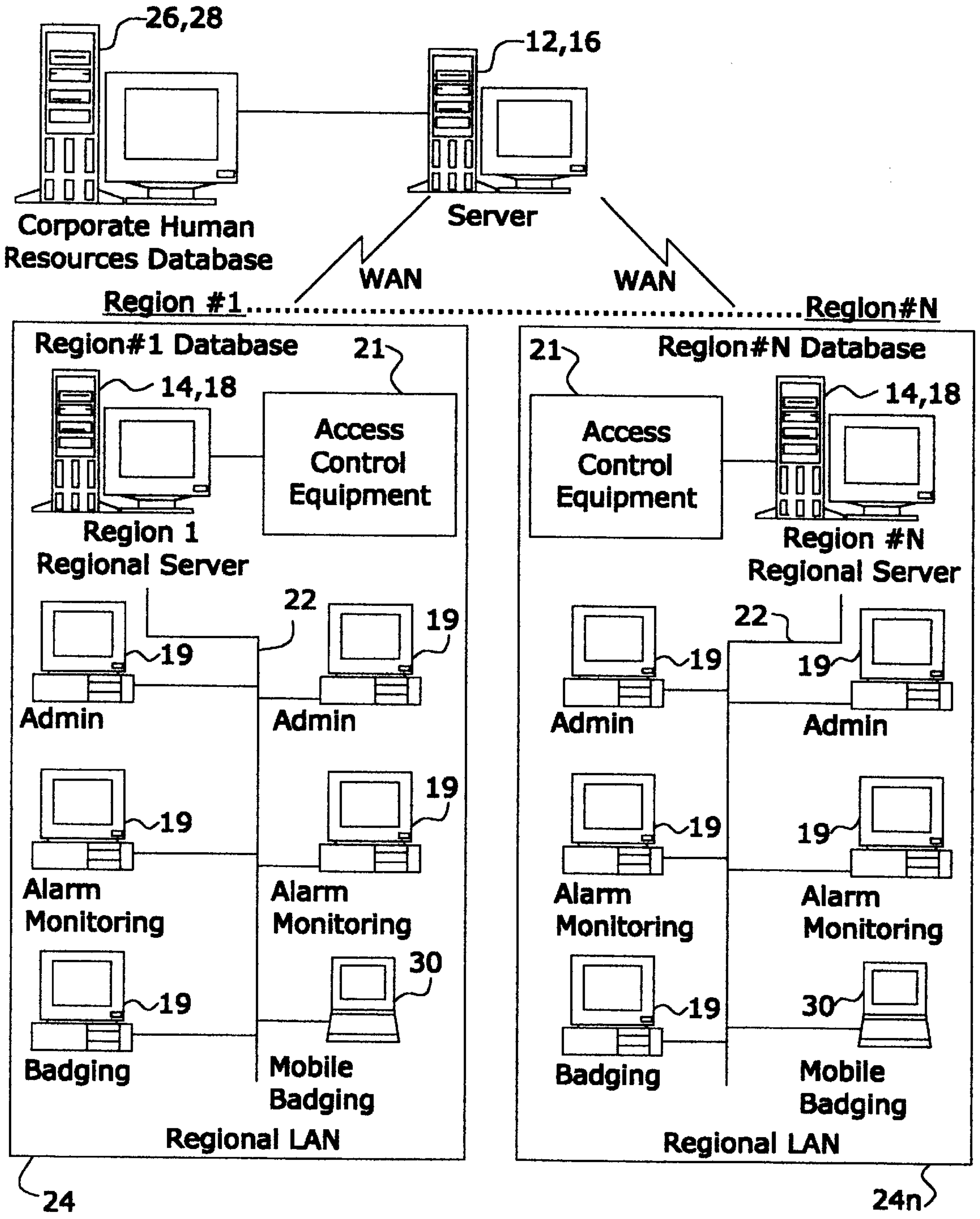
FIG. 2 is a block diagram showing the regions of the system of FIG. 1 in more detail.

FIG. 2 shows the system of FIG. 1 in more detail. Each region has a regional server 18 with a regional database 14 coupled to access control equipment 21, such as access controllers, alarm panels, and readers. Multiple workstations 19 provide various functions in the region, such as region administration (e.g., for updating the configuration of access control equipment or access levels), alarm monitoring in the region, and badging. One or several workstations 19 may provide these functions. The workstations 19 may be connected to the regional server 18 and regional database 14 via a regional LAN 22. For purposes of illustration only region #1 (denoted as numeral 24) and region #N (denoted as number 24*n*) are shown, where N equals the number of regions in the system.

Also shown in FIG. 2 is an external computer system 26 having an external database 28 storing employee and/or badge information which is coupled to the master database 12, via the master server 16, for downloading security information to the master database 12, where the master database represents the central database for the system 10. This downloading of security information is described in patent application Ser. No. 09/135,822, filed Aug. 18, 1998, which is herein incorporated by reference, and assigned to the same assignee as the present application. In the case where the system 10 provides access control and monitoring for a company located in several regions, the external database 28 may represent the corporate headquarters human resource's database. Each region may similarly have its own external computer system 26 having an external database 28 coupled to its regional database 14, via its regional server 18, for downloading security information to the regional database as described in patent application Ser. No. 09/135,822, where the regional database of each region represents a central database with respect to that region.

The master server 16 and regional servers 18 utilize database software for building and maintaining their respective databases 12 and 14. This software must provide the capability of building relational-type databases, one-way database replication of records between two databases, tracking of changes occurring in a database, and updating changes of a database to another database such that their records are identical. For example, this software may be SQL Server sold by Microsoft, Inc., Informix sold by Informix, Inc., or Sybase sold by Sybase, Inc. Software is also stored at the master server 16 and regional servers 18 for operating the system in accordance with programmed instructions in accordance with the flow charts of FIGS. 3–5. The information and data structure of databases 12 and 14 is described below. The term replication as used herein generally refers to synchronization of specific parts of two distinct databases such that the parts are identical.

The master database 12 stores cardholder information for the entire system, access control information for each region, and system information. Cardholder information represents information used by each region to manage badges to personnel in any of the regions. The cardholder information includes records stored in four different tables: Personnel (employee) table, Badge table, Multimedia table, and Access Level Link table. The Personnel table has data fields for information relevant to all employees, contractors, faculty, students, or any person who may be issued a badge, such as name, site, status, employee type, department, phone, Employee ID (EMPID), and the like. The Badge table has fields for the Badge Numbers of all badges used by employees, contractors, or other persons, to access areas of one or more buildings or sites controlled by the system, and other badge specific information, such as pin numbers, issue number, and the like. Each record in the Badge table is linked to a record in the Personnel table by a field set to EMPID. The Multimedia table is an optional table which records information about a person who may be issued a badge, such as a digital photograph of the person's face. Each record in the Multimedia table is linked to a record in the Personnel table by a field set to EMPID. The Access Level Link table has an identifier to a row or record to another Access Level table of the access control information, which determines the access privileges for the badge. Each record in the Access Level Link table is linked to a field set to the Badge Number to which it is associated. The cardholder information uses identifiers, such as Badge Number and EMPID, to uniquely identify records in the tables of the cardholder information. The information and data structures defined herein may be such as described in cited patent application Ser. No. 09/135,822.

Each record in the Personnel table and Badge table also includes a Last Change Date field. When a record in first added to a database, the Last Change Date field is set to the date and time the record was created. When a record is changed, the Last Change Date of the record is updated to the time and date the change occurred. When a record is added or changed for either the Multimedia table or Access Level Link table, the date and time of the addition or change updates the Last Change Date of the linked Personnel or Badge record, respectively.

Access control information for each region represents records of tables pertaining to the hardware configuration of access control equipment for the region, such as access controllers, alarm panels, and card readers, and tables relating to their function. Further the access control information includes the Access Level table. Each access level in this table defines the particular card readers through which access may be granted, and the time periods (zones) in which access may be granted at such readers. Access control information may also include tables with any other types of region specific information affecting access decisions, such as holidays or plant shut down periods when access for certain levels should be restricted, or event history. The access control information utilizes unique identifiers for access control equipment, such as reader identifiers, access controller identifiers, and alarm panel identifiers, to identify such equipment and the records in multiple tables of access control information related to such equipment.

The system information stored in the master database represents information which is uniform at each region's regional database. The system information includes tables defining system wide information and the records contained therein, such as general information about the sites, building, and regions of the system. The system information also includes information for establishing network connections and data communication via such connections, and the layouts (i.e., data fields) of all the tables in which records of cardholder information and access control information are to be stored, the badge layouts, the badge types, card formats, the types of multimedia stored as cardholder information, event types, the format of templates used to generated reports, ranges of unused identifiers for cardholder information and access control information allocated to each region in the system, and general system-wide configuration options, such as the maximum number of badges for each cardholder.

The above illustrates the master database while the system is operating, at installation of the system only the system information may be included in the master database, while cardholder information and access control information is uploaded from each regional database to the master database. The master database may at installation contain an initial set of cardholder information containing information downloaded from an external database, such as shown in FIG. 2. When the system is operating, each regional database is similar to the master database, except the access control information stored at the regional database is associated only with the region associated with the regional database. Further, the master database also includes a master cardholder transaction table, and each regional database includes a regional cardholder transaction table. The records stored in these tables will be described later in connection with FIGS.4 and 5.

The master database 12 may also store configuration information for operating the system which does not require to be downloaded to each region. Such information may include the unique Database ID (identifier) of each of the regional databases and of the master database in the system, or their addresses on the network. The regional database may also store regional configuration information which is needed only by the region, and thus is not uploaded to the master database.

Figure 3:
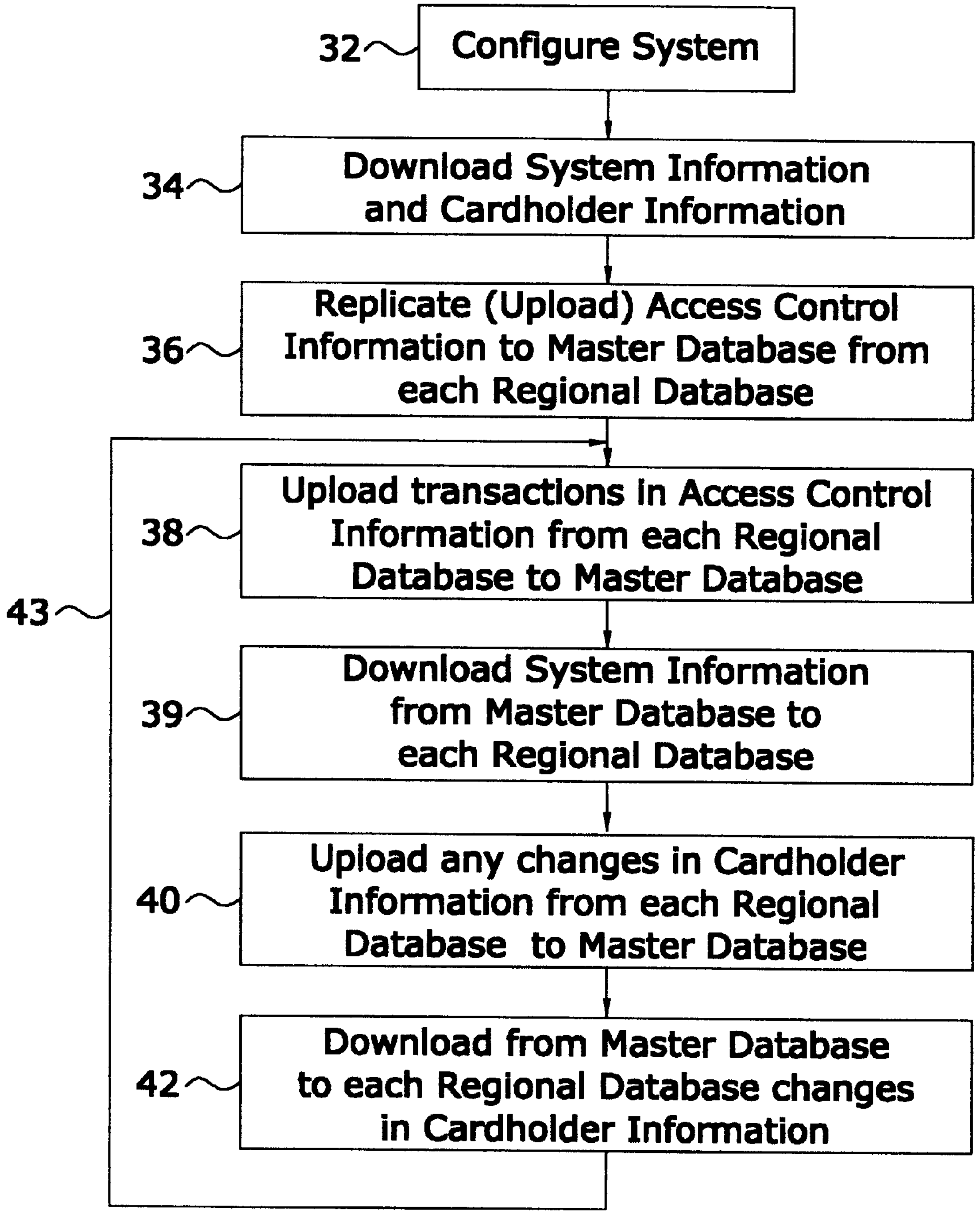
FIG. 3 is a flow chart showing the operation and programming of the system.
Figure 4:
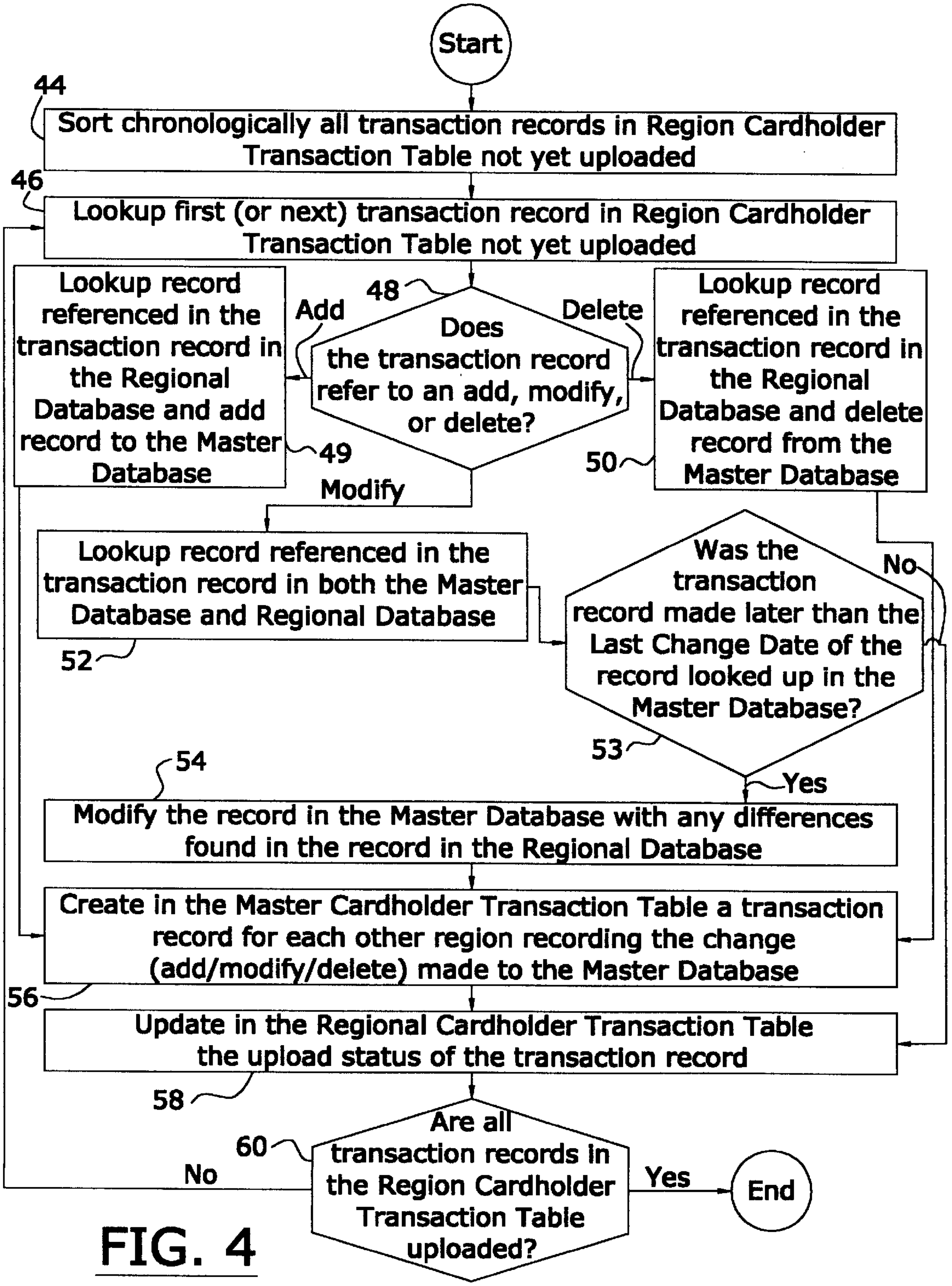
FIG. 4 is a flow chart showing the programming of FIG. 3 for uploading any changes (add, modify, or delete) in cardholder information from one of the regional databases of FIG. 1 to the master database of FIG. 1.
Figure 5:
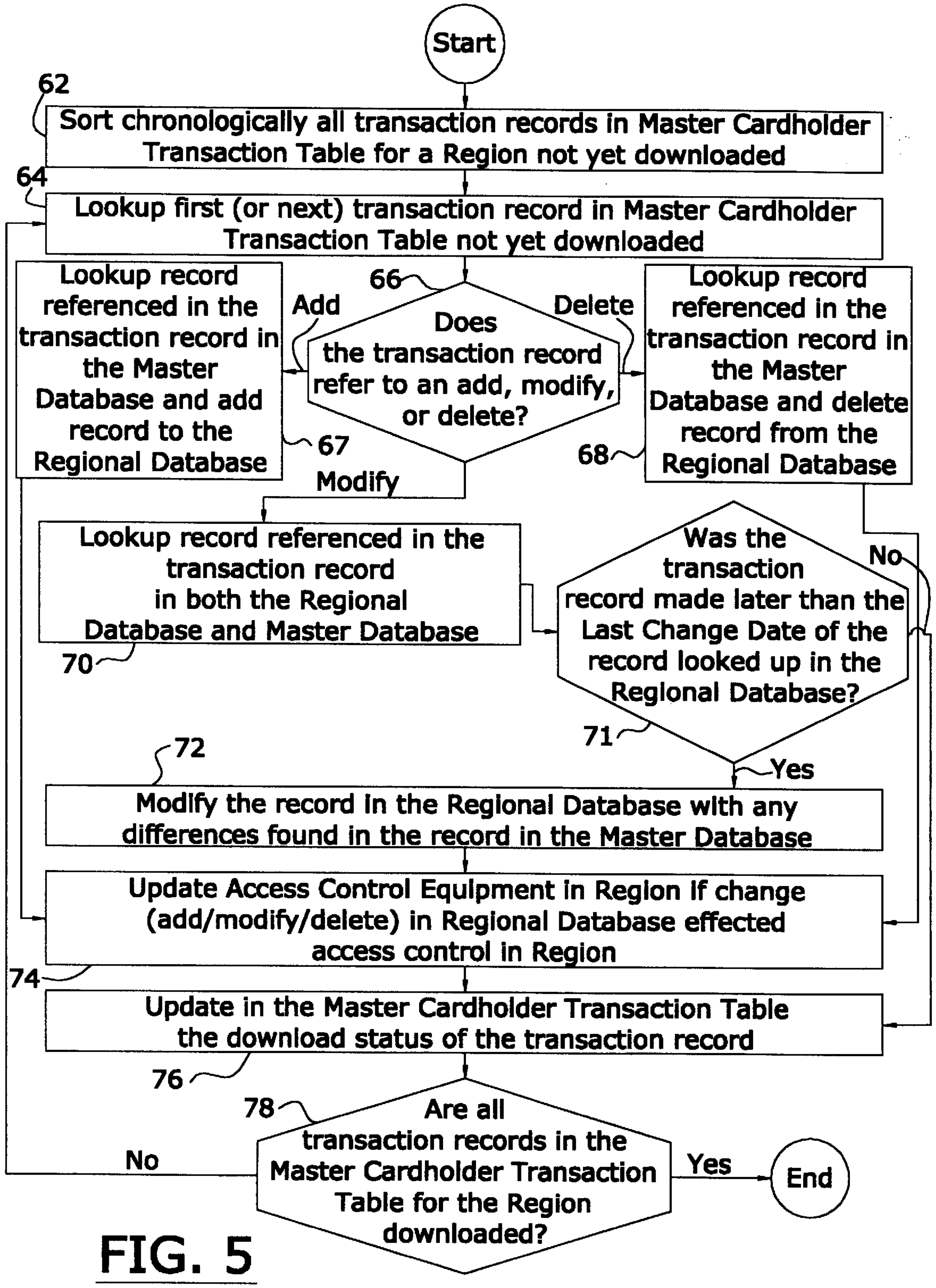
FIG. 5 is a flow chart showing the programming of FIG. 3 for downloading from the master database of FIG. 1 to one of the regional databases of FIG. 1 any changes (add, modify, or delete) in cardholder information made at the master database.

Referring to FIGS. 3, 4 and 5, the operation of system 10 will now be described. In FIG. 3, the first three steps 32, 34, and 36 provide installation of the system 10 in each region such that the identical cardholder information is stored in the master database 12 and each regional database 14, and that the master database 12 has stored all the access control information provided by each region. The system is configured at step 32 such that network connections can be established between the master server 16 and each regional server 18, and that database replication can take place between the master database 12 and each regional database 14. This requires identifying the master server 16 to each of the regions, such as by its network address or Database ID, and likewise identifying to the master server 16 each of the regions by their network address or Database ID. To establish proper communication by regional servers 18 in the network, part of the system information stored in the master database relating to data communication may be downloaded to each region at step 32 in order to synchronize communication between the master server 16 and each regional server 18 via their network connection. To establish database replication, the database software operating at each regional server 18 and the master server 16 is instructed as to which records of tables of the cardholder information and access control information are later to be replicated.

The configuration at step 32 also includes setting up in each region the operational software for administering of access control functions in the region for access control equipment in the region, and includes the monitoring of alarms in each region. The particular access control provided by each region is not critical, so long as each regional database 14 can store access control information for the region.

Optionally at step 32, if an external database having personnel information is present, such personnel information may be downloaded and stored as cardholder information in the master database. The downloading of personnel information and storing such information as cardholder information in a database is described in cited patent application Ser. No. 09/135,822.

Next, at step 34, the system information is downloaded from the master database 12 to each regional database 14 through their respective servers and then the cardholder information is downloaded. The downloaded system information is used by each regional server 18 to establish the data structure of tables and their data fields for storing cardholder information and access control information. This enables the downloaded cardholder information to be stored as records in the tables of the cardholder information at the regional database 14. This step is complete once each region stores the same system information and cardholder information as stored in the master database. If cardholder information has yet to be established, then none is downloaded at step 34.

When cardholder information is downloaded to a regional database from the master database, a set of default access levels may be assigned to each cardholder. Such default access levels to the Access Level table are defined in the access control information of each region, and may be based on the type of badge, where different categories of personnel, such as employees, contractors, faculty or students, or classifications of employees, may have different types of badges. Thus, each badge in the system can be used in each region of system 10 as defined by the entry or exit privileges for the access levels assigned for that badge for that region. If any of the cardholder information effects access control decisions in the region, then security information reflecting this change in the regional database is distributed automatically to the access control equipment of the region, as described in cited patent application Ser. No. 09/135,822.

At each region, with the tables now set up for the access control information (including the Access Level table), the region loads into these tables the configuration of the access control hardware and Access Levels. The configuration of the access control hardware and Access Level need not be complete at this time, since it can be updated later at the discretion of each region. At step 36, the access control information (tables and records in such tables) of each regional database 14 is replicated (or uploaded) to the master database, via their respective servers. This replication is facilitated by the database software operating at the master server and each regional server which was setup at step 32. Thus, the master database 12 stores the access control information from each regional database 14, which may be maintained under the Database ID of each region. This replication may be done simultaneously from each regional database 14 to the master database 12, or serially by each region server 18 in turn replicating its access control information to the master database 12.

Each region may add, modify, or delete any records stored in the access control information of its regional database 14 independent of the master database 12. The database software at each region keeps track of all changes (i.e., add, modify, or delete) of the access control information in a transaction log. This is a function of the database software setup earlier at step 32. On a predefined schedule, such as every 24 hours, each regional server 18 connects to the master server 16 and uploads (writes) the transactions in access control information stored in the transaction log to the master database (step 38), such that the access control information stored in the master database 12 is again identical to the access control information stored in each regional database 14. This upload of transactions is another function of the database software for replicating the part of the master database 12 and regional database 14 pertaining to the access control information.

After step 38, the system information is updated from the master database to each regional database (step 39). This is achieved by the regional server deleting all records in the regional database relating to system information, and then downloading the records for the system information from the master database to the regional database. Step 39 may occur periodically, or step 39 may occur only when a change in the system information at the master database must be distributed to all regional databases.

In addition to changing access control information, each region may add, modify, or delete any records stored in the tables of the cardholder information independent of the master database or any other region. After each change (i.e., add, modify, or delete) is completed, a transaction record is added to the regional cardholder transaction table for the region. The data structure for this transaction record includes, for example, data fields for the following: Time, Transaction ID, EMPID, Badge Number, Action Type (either add, modify, or delete), Object Type, and the Destination Database ID. Time is the time (date and time) that the transaction was made. Each server in the system 10 has a clock maintaining the date and time for the system, as typical of computer servers. The Transaction ID is a unique identifier for the transaction at the region. EMPID is an employee identifier associated with the record of a Personnel Table of the cardholder information effected. Badge Number is the badge identifier for the record effected, and is used if the change in cardholder information effected a record of either a Badge table or an Access Level Link table. Object Type represents the type of record effected by the change in cardholder information, either a Personnel record, Badge record, Multimedia record, or Access Level Link record, associated with the Personnel, Badge, Multimedia, or Access Level Link table, respectively. The Destination Database ID is the database to be updated in accordance with the transaction record. In the case of a regional transaction record, the Destination Database ID data field is set to the Database ID associated with the master database. Each transaction record is stored in the regional cardholder transaction table with an upload status flag. The upload status flag is initially set to a "not done" value to indicate that the upload of the transaction record to the master database has not yet occurred. The upload status flag may have one of three values indicating "not done", "done", and "failed".

On a predefined schedule, such as every 24 hours, each regional server 18 connects to the master server 16 and uploads changes in cardholder information from the regional database 14 to the master database 12 in accordance with the transaction records stored in the regional cardholder transaction table (step 40). The process for uploading changes in cardholder information by the regional server for each region is shown in FIG. 4. First, all the transaction records in the regional cardholder transaction table not yet uploaded (i.e., upload status flags set to "not done") are sorted chronologically in ascending order based on the time field of each transaction record (step 44). Second, the first transaction record in the sorted transaction records not yet uploaded is looked up in the regional cardholder transaction table (step 46). If the Action Type of this transaction record represents a modify action (step 48), the branch to step 52 is taken and the record referenced by Object Type and either EMPID, or Badge Number, of the transaction record is looked up (accessed) by the regional server at both the regional database and the master database. The regional server then checks if the Time data field of the transaction record is later than the Last Change Date of the record looked up in the master database (step 53). If not, then the no branch to step 58 is taken and no modification of the record in the master database is made. If the record looked up relates to a Multimedia or Access Level Link table, the Last Change Date of the associated Personnel or Badge record, respectively, is used at step 53. If the Time data field of the transaction record is later than the Last Change Date of the record looked up in the master database, the record at the master database is modified with any differences found in the record at the regional database (step 54), such that the record at the master database is identical to the record at the regional database. Thus, step 53 assures that the system maintains in the master database the most recently modified records of cardholder information. When a record in the master database is modified at step 54, the master server then creates in the master cardholder transaction table a transaction record for each of the other regions in the system recording the change (i.e., modify) made to the record of the cardholder information at the master database (step 56). The data structure for each transaction record in the master cardholder transaction table is identical to the data structure of the transaction record stored in the regional cardholder transaction table. Each transaction record added has the Destination Database ID data field set to the Database ID of the regional database to be updated in accordance with the transaction record. In other words, at step 56, multiple transaction records (equal to the number of regions minus one) are added to the master cardholder transaction table in which each transaction record is identical, except for the Destination Database ID. No transaction record is added in the master cardholder transaction database with the Database ID associated with the region which uploaded the change to the master database. A download status flag is included in each transaction record added. The download status flag is initially set to a "not done" value to indicate that the download of the transaction record to the regional database identified in the record has not yet occurred. The download status flag may have one of three values indicating "not done", "done", and "failed".

Once the record is communicated to the master database, the regional server sets the upload status flag of the transaction record in the regional cardholder transaction table to a "done" value if the transaction record was successfully uploaded (step 58), otherwise, the upload status flag is set to a "failed" value. For example, a failed upload may be due to a problem in modifying, adding, or deleting a record at the master database. If all the transactions as identified by their transaction records in the regional cardholder transaction table have been uploaded, the upload of cardholder information for the region is complete (step 60), otherwise the branch to step 46 is taken to upload the next transaction record in the regional cardholder transaction table.

If at step 48 the transaction record has an Action Type for an add action, the branch to step 49 is taken. At step 49, the regional server looks up in the regional database the record referenced by Object Type and either EMPID, or Badge Number, of the transaction record and adds the record found in the regional database to the master database. After the record is added to the master database, a branch to step 56 is taken in which the master server creates in the master cardholder transaction table a transaction record for each of the other regions recording the change (i.e., add) of the new record to the master database, as described earlier. Thereafter, the regional server sets the upload status flag of the transaction record in the regional cardholder transaction table to a "done" value if the transaction record was successfully uploaded, otherwise, the upload status flag is set to a "failed" value (step 58). If all the transactions as identified by their transaction records in the regional cardholder transaction table have been uploaded (step 60), the upload of cardholder information for the region is complete, otherwise, the branch to step 46 is taken to upload the next transaction record in the regional cardholder transaction table.

If at step 48, the transaction record has an Action Type set to delete, the branch is taken to step 50. At step 50, the regional server looks up the record in the master database referenced by Object Type and either EMPID, or Badge Number, of the transaction record, and that record is deleted from the master database. After the record is deleted from the master database, a branch to step 56 is taken in which the master server creates in the master cardholder transaction table a transaction record for each other region recording to the change (i.e., delete) made to the record of the cardholder information at the master database, as described earlier. The regional server then sets the upload status flag of the transaction record in the regional cardholder transaction table to a "done" value if the transaction record was successfully uploaded, otherwise, the upload status flag is set to a "failed" value (step 58). If all the transactions as identified by their transaction records in the regional cardholder transaction table have been uploaded (step 60), the upload of cardholder information for the region is complete, otherwise, the branch to step 46 is taken to upload the next transaction record in the regional cardholder transaction table.

The regional server next downloads from the master database to the regional database changes in cardholder information in accordance with the transaction records stored in the master cardholder transaction table having a Destination Database ID for that regional database (step 42). The process for downloading changes in cardholder information by the master server to each regional database is shown in FIG. 5. First, all the transaction records in the master cardholder transaction table not yet downloaded (i.e., download status flags set to "not done") are sorted chronologically in ascending order based on the time field of each transaction record (step 62). Second, the first transaction record in the sorted transaction records not yet downloaded is looked up in the master cardholder transaction table (step 64). If the Action Type of this transaction record represents a modify (step 66), the branch to step 70 is taken and the master server looks up the record referenced by Object Type and either EMPID, or Badge Number, of the transaction record at both the regional database and the master database. The master server then checks if the Time data field of the transaction record is later than the Last Change Date of the record looked up in the regional database (step 71). If not, then the no branch to step 76 is taken and no modification of the record in the regional database is made. If the record looked up relates to a Multimedia or Access Level Link table, the Last Change Date of the associated Personnel or Badge record, respectively, is used at step 71. If at step 71 the Time data field of the transaction record is later than the Last Change Date of the record looked up in the regional database, the record in the regional database is modified with any differences found in the record in the master database (step 72), such that the record at the master database is identical to the record at the regional database. Thus, step 71 assures that the system maintains in the regional database the most recently modified records of cardholder information. After step 72, if the change in the record of the cardholder information affects access control decisions in the region, then security information reflecting this change in the regional database is distributed automatically to the access control equipment of the region (step 74), as described in cited patent application Ser. No. 09/135,822. Once the record is successfully updated to the regional database, the master server sets the download status flag of the transaction record in the master cardholder transaction table to a "done" value if the transaction record was successfully downloaded (step 76), otherwise, the download status flag is set to a "failed" value. For example, a failed download may occur due to a problem in writing a record change to the regional database. If all the transactions as identified by their transaction records in the master cardholder transaction table have been downloaded, the download of cardholder information to the region is complete, otherwise, the branch to step 64 is taken to download the next transaction record in the master cardholder transaction table.

If at step 66, the transaction record has an Action Type set to add, the branch is taken to step 67. At step 67, the master server looks up the record referenced by Object Type and either EMPID, or Badge Number, of the transaction record in the master database and adds the record to the regional database. When the record added to the regional database is an Access Level Link table, identifier(s) may be stored in that record to default access level(s) which may be assigned by the regional server in that record to the Access Level table for the region. After the record is added to the regional database, a branch to step 74 is taken in which if the change in the record of the cardholder information affects access control decisions in the region, then security information reflecting this change in the regional database is distributed automatically to the access control equipment of the region (step 74), as described in cited patent application Ser. No. 09/135,822. Thereafter, the master server sets the download status flag of the transaction record in the master cardholder transaction table to a "done" value if the transaction record was successfully downloaded, otherwise, the download status flag is set to a "failed" value (step 76). If all the transactions as identified by their transaction records in the master cardholder transaction table have been downloaded, the download of cardholder information to the region is complete, otherwise, the branch to step 64 is taken to download the next transaction record in the master cardholder transaction table.

If at step 66, the transaction record has an Action Type set to delete, the branch is taken to step 68. At step 68, the master server looks up the record referenced by Object Type and either EMPID, or Badge Number, of the transaction record in the regional database and deletes the record from the regional database. After the record is deleted from the regional database, a branch to step 74 is taken in which if the change in the record of the cardholder information affects access control decisions in the region, then security information reflecting this change in the regional database is distributed automatically to the access control equipment of the region (step 74), as described in cited patent application Ser. No. 09/135,822. The master server then sets the download status flag of the transaction record in the master cardholder transaction table to a "done" value if the transaction record was successfully downloaded, otherwise, the download status flag is set to a "failed" value (step 76). If all the transactions as identified by their transaction records in the master cardholder transaction table have been downloaded, the download of cardholder information to the region is complete, otherwise, the branch to step 64 is taken to download the next transaction record in the master cardholder transaction table.

Referring back to FIG. 3, after step 42 is complete for a region, the cardholder information stored in the regional database will be identical to the cardholder information stored in the master database, unless a failed upload or download of a transaction record occurred. For each region, steps 38–42 may occur during the same communication session established between the regional server 18 of the region and the master server 16 or in different communication sessions. Further, steps 38–42 may take place in different order. But, regardless of the order of these steps, it is important that they occur periodically for each region, as indicated by loop 43, to enable distribution of cardholder information to databases of the system, uploading access control information to the master database from each region, and downloading of system information to regional databases. For example, the periodic interval may be daily or hourly. This interval may also be variable for one or all regions in which either step 38, 39, 40 or 42 occurs in real-time whenever a change (add/modify/delete) is made to either the regional or master database. In this manner, changes which have occurred in the cardholder information and access control information of each regional database are periodically uploaded from each regional database to the master database since such information was last identical between the regional database and the master database. Further, for each region, changes in cardholder information uploaded to the master database from other regions (or due to changes in cardholder information made to the master database via master workstations) are periodically downloaded to the regional database of the region. Thus, the master database maintains a repository of information, i.e., system, cardholder, and access control information, used by each of the regions of the system, and as described later, information used by a portable badging system 20 (FIG. 1).

At step 40, it is possible during the upload of changes in cardholder information from a regional database to the master database that one or more changes cannot be uploaded. This is due to the record of cardholder information being effected by an earlier upload from another regional database, or by a change to the record made in the master database by a user via master computer workstations 17. For example, if at a first region, a record was removed from the Badge table in its regional database, and at a second region, the same record was modified in its regional database, then the regional server of the first region when uploading changes in cardholder information will remove this record of the Badge table in the master database, and then the regional server of the second region will be unable to locate that record in the master database during its upload at step 52 (FIG. 4). Whenever a regional server is unable to upload one of its transaction records, it sets the upload status flag of the transaction record to a "failed" value. In the above example, when cardholder information is downloaded to the second regional database later at step 42 (FIG. 5) having changes made by other regions, that record of the Badge table will be removed from the second regional database. A similar condition can occur at step 42 when the master server is unable to download a change in cardholder information to a region. Whenever the master server is unable to download one of its transaction records, it sets the download status flag of the transaction record to a "failed" value.

When the regional server sets the upload status flag of a transaction record of its regional cardholder transaction table to a "failed" value, the details of the failed upload may be entered in an error log by the regional server in the regional database. For example, these details may include the time of the attempted upload in accordance with the transaction record, a copy of the data sent to the master server, a copy of the record associated with the transaction record in the regional database, or, if applicable, a copy of the record in the master database to which upload was attempted. An administrator at the regional server can investigate the failed upload using this entry in the log, and decide either to delete the transaction record, or fix the problem causing the failed upload and retry upload of the transaction record the next time step 40 occurs for that region by resetting the upload status flag of the transaction record to a "not done" value. Similarly, when the master server sets the download status flag of a transaction record of its master cardholder transaction table to a "failed" value, the detail of the failed download may be entered in an error log by the master server in the master database. An administrator at the master server can investigate the failed download using this entry in the log, and decide either to delete the transaction record, or fix the problem causing the failed download and retry download of the transaction record the next time step 42 occurs to that region by resetting the download status flag of the transaction record to a "not done" value.

Each region is capable of deleting, modifying, or generating badges for use in accessing areas throughout all the regions of the system 10, called badging. As stated earlier, a computer workstation 19 coupled to the regional database 14, via regional server 18, can provide for such badging. The modifying of badges is provided by updating records in the tables of the cardholder information, while deleting of badges is provided by removing records in such tables. For example, to update a person's badge to access areas for a particular region, a user via the regional server can access the cardholder information for a person in the regional database of the region, and set the badge for this person to an Access Level of the region, i.e., add an Access Level Link table for Badge Number having an identifier to the Access Level table of the region. The generating of new badges requires new identifiers, such as EMPID or Badge Number, for building new records for the tables in the cardholder information in the regional database. Each region obtains such new identifiers from the ranges of unused identifiers allocated to the region via the downloaded system information (step 34 of FIG. 3). Similarly, each region provides for deleting, modifying, or generating records for access control information. To generate new records for access control information, each region obtains new identifiers from the ranges of unused identifiers allocated to the region for such information. Thus, when the master database is uploaded with new records from each region generated using new identifiers, such records will not interfere with existing records.

In addition to the master database 12 storing transaction records in response to changes in cardholder information uploaded from each region, the cardholder information stored at the master database could also be changed by a user at a master computer workstation 17, or at a regional computer workstation 19 having permission to access the master database. For each change (i.e., add, modify, or delete) so made in a record to a table of the cardholder transaction information, a transaction record is entered into the master cardholder transaction table for each region. The data structure for each transaction record in the master cardholder transaction table is identical to the data structure of the transaction record stored in the region cardholder transaction table. Each transaction record added has the Destination Database ID data field set to the Database ID of the regional database to be updated in accordance with the transaction record. In other words, at step 56, multiple transaction records equal to the number of regions are added to the master cardholder transaction table in which each transaction record is identical, except for the Destination Database ID. The download status flag is included in each transaction record added to the master cardholder transaction table which is initially set to a "not done" value.

As stated earlier, each regional database may further include regional configuration information needed only by the region. Regional configuration information is not replicated to the master database or provided to other regions, but located only on the regional database of the region. For example, such regional configuration information may include access groups, where various access levels may be defined as part of an access group, or zones of areas monitored by the region.

Referring back to FIG. 1, system 10 may also include a portable badging system 20 having a portable database 15. This database 15 may represent another regional database in the system, except that no access control information is stored in the database and the database is not coupled to access control equipment. Portable badging system 20 may represent a laptop computer, while database 15 may represent the hard drive or other memory storage unit coupled to the computer. A network connection may be established between the badging system 20 and the master database 12, via the master server 16, as denoted by arrows 13. The portable badging system 20 has a Database ID in system 10 and a cardholder transaction table, such that it can participate in the periodic uploading and downloading of changes in cardholder information as described earlier. In operation, the portable badging system 20 performs the same as the regional database and regional server as described in connection with FIGS. 3–5, except that steps 36 and 38 are not required. Although only one portable badging system in shown in FIG. 1, system 10 may have any number of such portable badging systems.

Figure 6:
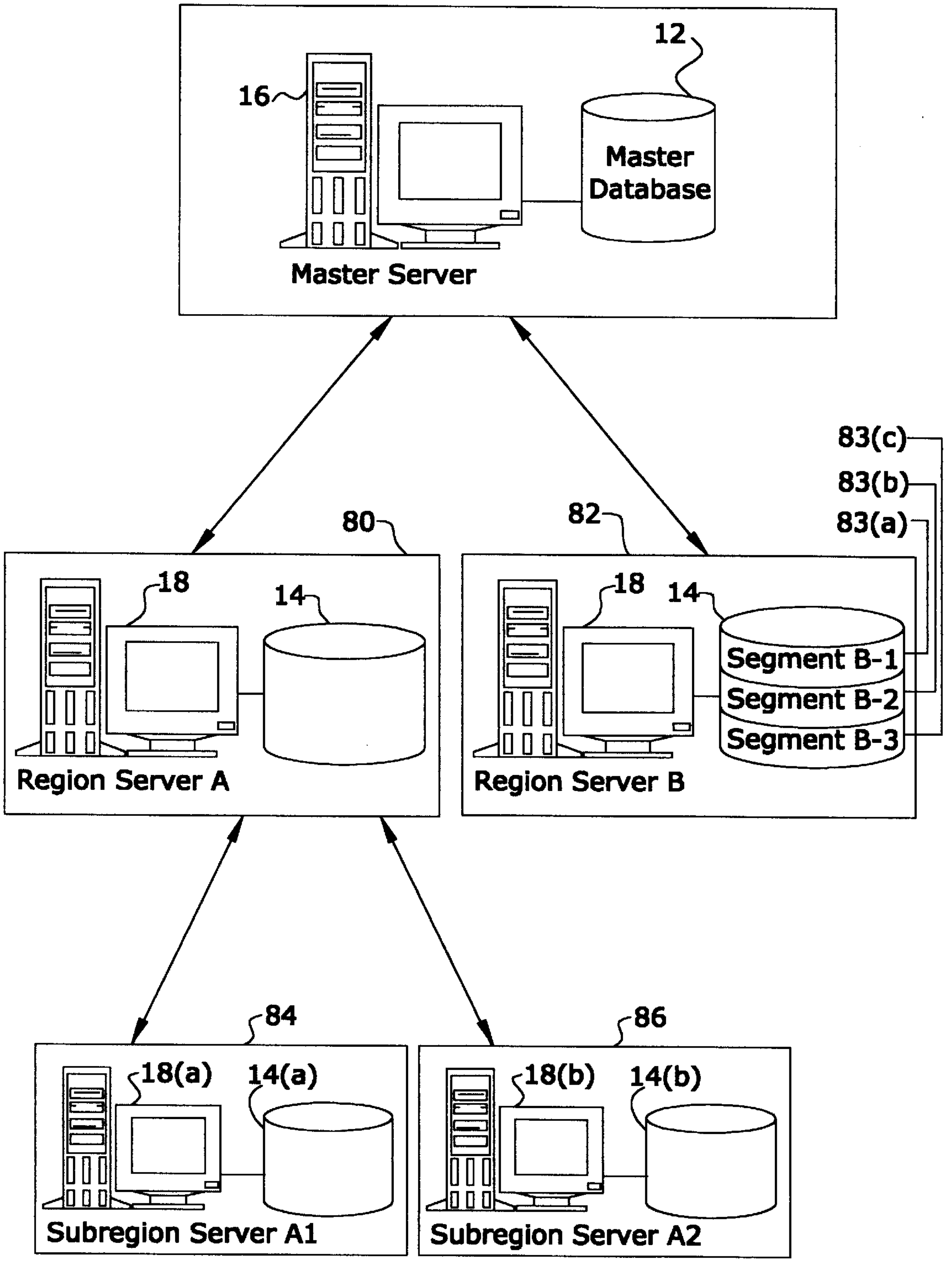
FIG. 6 is a block diagram showing an example of the logical segmentation of a regional database and an example of a region having multiple subregions.

For purposes of database and network management, one or more of the regional databases 14 may be logically segmented into two or more segments, where each segment has a unique Segment ID. A segmented regional database is the same as described earlier, except that each record of access control information is assigned a Segment ID. The Segment ID is included in the access control information uploaded to the master database at steps 36 and 38 (FIG. 3). Each segment is composed of records relating to a different set of access control equipment, i.e., access controllers, card readers, and alarm panels. A segment may relate to a group of areas in the region where access is controlled, such as a department, company division, or other section where logical partitioning of access control is desired. Although segmenting a regional database is optional, it can facilitate administration in the region by enabling administration segment by segment. For example, a user may be given permission to view or edit from a workstation only the access control information related to specific segment(s). Segmentation also enables a segment to have access control configuration different from another segment in terms of the programmable features such as timezones or access levels. Further, the access controllers in a segment need only store records pertinent to their segment, thereby increasing the total number of records which can be stored in access controllers within the entire region. FIG. 6 shows an example of segmentation of a region 82 where the regional database of each region has three segments 83(*a*), 83(*b*), and 83(*c*). The segments are illustrated as separate parts of the database for purpose of illustration.

Optionally in system 10, a regional database 14 may serve as a master database to one or more subregional databases in subregions of a region. This is shown, for example, in FIG. 6 in which region 80 has subregions 84 and 86. A subregional database 14(*a*) and 14(*b*) is provided for subregion 84 and 86, respectively, through a subregional server 18(*a*) and 18(*b*), respectively. Each subregional database represents a regional database to the regional database serving as a master database, and stores access control information for the subregion, and system information and cardholder information similar to a regional database. The subregional database operates like the regional database and the regional database operates like the master database as described in connection with FIGS. 3–5. Each subregion has access control equipment having a number of access controllers and reader coupled each access controller, and an Access Level table having, for each access level, the readers and time zones defining where and when entry/exit will be granted for that subregion. The subregion may have access control equipment and computer workstations coupled to the subregional database. Further, each subregional database can then serve as a master database to further databases in that subregion, and so forth, thus providing multiple levels of subregional databases. For example, the sites of a company in Tokyo, Los Angeles, and the Eastern United States may each represent a region in system 10, the Eastern United States region may have sites in subregions of New York State, Boston and Atlanta, and New York State may have further have sites in subregions of New York City and Rochester.

Each subregional database has a Database ID. This enables each subregional database to upload and download changed cardholder information with the regional database acting as a master database. The upload and download of cardholder information is the same as described earlier between a regional database 14 and master database 12, except that when a record is changed at the regional database in response to an upload from a subregional database, in addition to transaction records being created for each other subregional database, a transaction record is created for updating the master database 12 by setting the Destination Database ID of the record to that of the master database. Accordingly, when the regional database participates in uploading changes in cardholder information to the master database 12, changes in cardholder information made at subregional databases are uploaded to the master database. Further, when a record in the regional database is changed responsive to a download from the master database, a transaction record is created in the regional cardholder transaction for each subregional database associated with the regional database. Thus, when the regional database participates in the downloading changes in cardholder information to the subregional database 12, changes in cardholder information originally made at master database are downloaded to the subregional database. Also, changes in access control information made at each subregional database are replicated to the regional database acting as a master database to the subregions, as described earlier between a regional database 14 and the master database 12. Such changes made in the access control information at the regional database in accordance with the subregional databases are then replicated to the master database. The master server 16 may store in the master database the access control information separately for each subregion. System information downloaded to the regional database acting as a master database is downloaded from the regional database to each subregional database, where each subregional database is allocated a different subset of unused identifiers assigned to the region. Therefore, the master database 14 contains all access control information and events for generating reports on system 10, and all cardholder changes made anywhere in the system are distributed throughout the databases of the system. Further, like regional databases, subregional databases operate independently of the master database and the regional databases, in accordance with their respective subregional database.

For the purpose of tracking access control information in the regional database, each different subregion may be assigned a Segment ID, as defined above, and records of access control information for each subregion include the Segment ID of the subregion. The subregional database, like a regional database, may be segmented into two or more segments, such as described earlier.

Referring back to FIG. 2, a mobile badging unit 30 may also be coupled to the region database 14, through regional server 13. The mobile badging unit 30 has a database, which represents another subregional database to the regional database, except that no access control information is stored in the database and the database is not coupled to access control equipment. Mobile badging unit 30 may represent a laptop computer and its database a hard drive or other memory storage unit. A network connection may be established between the badging unit 30 and a regional database 14, via the regional server 18. The mobile badging unit 30 has a Database ID and a cardholder transaction table, such that it can participate in the periodic uploading and downloading of changes in cardholder information with the regional database to which it is associated. In operation, the mobile badging units 30 performs the same as the subregional database and subregional server, except that steps 36 and 38 are not required. Thus, the mobile badging unit operates similar to the portable badging unit 20, but with respect to the regional database, rather than the master database.

As stated earlier, regional computer workstations 19 coupled to a regional database 14, via a regional server 18, can in addition to logging into the regional server, can login to other regional servers 18 in the system or the master server, depending on user permission. This can provide badging, monitoring, or administration functions outside of a region. A single computer workstation 17 or 19 can monitor the operation of the access control equipment in one region or simultaneously in multiple regions by logging onto the regional server of such regions. Such monitoring of the operation of the access control equipment of a region, such as alarm panels or access controllers, may be performed, for example, by query as to status, events, or alarms.

System 10 can be separated into two systems, a first system for providing security access control in multiple regions in accordance with access control information at each regional database, and a second system for managing badging for security access control in multiple regions in accordance with cardholder information at each regional database. The first and second systems could be operated independent of each other in which the master database in the first system would provide a repository of all access control information in each region, while the master database in the second system would provide a repository of all cardholder information in the system and facilitate the distribution of changes in cardholder information from each of the regions to other regions. The operation of the first system for providing security access control in multiple regions would be identical to that of described in connection with FIG. 3, except step 34 would download only system information, and steps 40 and 42 would not be required. The operation of the second system for managing badging for security access control in multiple regions would be identical to that described in connection with FIGS. 3–5, except steps 36 and 38 would not be required.

The data structures described above are exemplary. Other data structures with different information may be used with different tables for storing the information described herein. For example, the Personnel table of the cardholder information may be two or more related tables for purposes of data storage management.

From the foregoing description, it will be apparent that an improved access control system operating in multiple regions has been provided. Variations and modifications of the herein described system and other applications for the invention will undoubtedly suggest themselves to those skilled in the art. Accordingly, the foregoing description should be taken as illustrative and not in a limiting sense.

What is claimed is:

1. A system for controlling access in a plurality of regions in which each region comprises one or more sites having areas to which access is controlled, said system comprising:

a master database for storing system information, cardholder information for the system, and access control information for each of said regions;

a plurality of regional databases in which each of said regional databases is associated with one of said regions;

means for downloading said system information and cardholder information from said master database to each of said regional databases; and means for uploading to said master database access control information from each of said regional databases to provide said stored access control information at said master database, wherein each of the regions operates independently of the master database in accordance with their respective regional database.

2. The system according to claim 1 further comprising:

means for uploading periodically from each of said regional databases to said master database any additions, modifications, or deletions in said access control information of said regional database to enable the access control information stored at said master database to be identical to the access control information stored at said regional database.

3. The system according to claim 1 further comprising:

means for uploading periodically from each of said regional databases to said master database any additions, modifications, or deletions in said cardholder information of said regional database to enable the cardholder information stored at said master database to be identical to the cardholder information stored at said regional database.

4. The system according to claim 3 wherein said uploading means further comprises a regional cardholder transaction table in each of said regional databases for recording any additions, modifications, or deletions in said cardholder information of the regional database to define how cardholder information from the regional database is to be uploaded to said master database.

5. The system according to claim 1 further comprising:

means for downloading from said master database to each of said regional databases cardholder information in accordance with any additions, modifications, or deletions in said cardholder information uploaded to said master database from other regional databases.

6. The system according to claim 5 wherein said downloading means further comprises a master cardholder transaction table in the master database for recording any additions, modifications, or deletions in said cardholder information made to the master database to define how cardholder information from the master database is to be downloaded to each of the regional databases.

7. The system according to claim 1 wherein said cardholder information and access control information each utilize unique identifiers to different parts of said cardholder information and access control information, respectively.

8. The system according to claim 5 further comprising means for automatically distributing security information in each region responsive to said downloaded cardholder information to means in the region for controlling access to the areas in the region.

9. The system according to claim 7 wherein said system information downloaded comprises ranges of unused identifiers allocated to each of said regional databases for enabling each said region to generate additional cardholder information and access control information in said regional database.

10. The system according to claim 9 wherein each of said regions manages badges worn by personnel to access areas in accordance with said cardholder information stored at the regional database of the region.

11. The system according to claim 9 wherein each of said regions administers access control of the region in accordance with said access control information stored at the regional database of the region.

12. The system according to claim 1 further comprising a network capable of providing connection for transfer of data between said master database and each of the regional databases.

13. The system according to claim 1 further comprising a master computer system coupled to said master database, and a regional computer system coupled to each of said regional databases which is capable of established data communication to said master computer system, wherein said master computer system and the regional computer system coupled to each of said regional databases enables said downloading means and uploading mean.

14. The system according to claim 13 wherein said master computer system represents a master computer server, and said regional computer system coupled to each of said regional databases represents a regional computer server.

15. The system according to claim 1 wherein for each of said regions said access control information for the region represents information for controlling access control equipment within the region.

16. The system according to claim 1 further comprising:

at least one database of a portable badging system; and said downloading means further comprising means for downloading said system information and cardholder information of said master database to said database of the portable badging system.

17. The system according to claim 16 wherein said portable badging system further comprises means for uploading periodically from the database of the portable badging system to said master database any additions, modifications, or deletions in said cardholder information of the database of the portable badging system to enable the cardholder information stored at said master database to be identical to the cardholder information stored at the database of the portable badging system.

18. The system according to claim 16 further comprising means for downloading from said master database to the database of the portable badging system cardholder information in accordance with any additions, modifications, or deletions in said cardholder information uploaded to said master database from other regional databases and any other ones of said portable badging system.

19. An access control system comprising:

a plurality of regions in which each region comprises one or more sites having areas to which access is controlled;

a master database for storing system information, cardholder information for the system, and access control information for each of said regions;

a plurality of regional databases in which each of said regional databases is associated with one of said regions;

a master computer system coupled to said master database;

a plurality of regional computer systems each coupled to a different one of said regional databases and capable of communicating with said master computer system in which said master computer system downloads said system information and cardholder information from said master database to each of said regional databases, and each of said regional computer systems provides for uploading to said master database access control information from each of said regional databases to provide said stored access control information at said master database.

20. A system for providing security access control in a plurality of regions in which each region comprises one or more sites having areas to which access is controlled, said system comprising:

a plurality of regional databases in which each of said regional databases is associated with one of said regions and stores information used by the region for security access control in the region and for managing badges worn by personnel to access areas; and a master database having information which is initially identical to said information stored in each of said regional databases, wherein each region operates independently of the master database in accordance with the information of their respective regional database.

21. The system according to claim 20 where in said information stored in each of said regional databases and said m aster database further comprises system information for maintaining uniformity in each of said regional databases while enabling each region to operates independently of the master database.

22. The system according to claim 20 further comprising:

means for maintaining said information stored in said master database identical to said information stored in each of said regional databases.

23. The system according to claim 22 wherein said maintaining means further comprises means for communicating data said master database and each of said regional databases.

24. The system according to claim 22 wherein said maintaining means further comprising:

means for downloading at least a part of the information from said master database to each of said regional databases; and means for uploading at least a part of the information from each of said regional databases to said master database.

25. The system according to claim 22 wherein said maintaining means further comprises means for periodically uploading to said master database from each of said regional databases changes in the part of said information stored at the regional database for security access control.

26. The system according to claim 22 wherein said maintaining means further comprises means for periodically uploading to said master database from each of said regional databases changes in the part of said information stored at the regional database for managing badges.

27. The system according to claim 22 wherein said information stored in each of said regional databases further comprises system information for maintaining uniformity in each of said regional databases while enabling each region to operates independently of the master database, and said maintaining means further comprises means for periodically downloading to each of said regional databases from said master database changes in the part of said information stored at the master database representing system information.

28. The system according to claim 23 further comprising a master computer system coupled to said master database, and a regional computer system coupled to each of said regional databases, in which said maintaining means is enabled through said communicating means by said master computer system and the regional computer system coupled to each of said regional databases.

29. The system according to claim 23 wherein said communicating means represents a communication network.

30. The system according to claim 20 further comprising means for distributing from one of said regional databases to other of said regional databases through said master database changes in the information stored at said one of regional databases for managing badges.

31. The system according to claim 20 further comprising a master computer system coupled to said master database, and a regional computer system coupled to each of said regional databases.

32. The system according to claim 31 further comprising one or more master computer workstations for enabling users to interface to said master database through said master computer system.

33. The system according to claim 32 further comprising for each region one or more regional computer workstations for enabling users to interface to the regional database of the region through the regional computer system associated with said regional database.

34. The system according to claim 33 wherein at least one of said regional computer workstations for at least one of said regions can interface with the regional database of one or more other of said regions.

35. The system according to claim 33 wherein at least one of said regional computer workstations for at least one of said regions can interface to said master database through said master computer system.

36. The system according to claim 33 wherein at least one of said regional computer workstations for at least one of said regions can interface with the regional database of multiple ones of said regions simultaneously.

37. The system according to claim 20 wherein one of said regions represents a portable badging system having a database representing the regional database of one of said regions which does not stores information for security access control.

38. The system according to claim 20 further comprising:

one or more subregional databases in which each of said subregional databases is associated with a subregion within one of said regions and stores information used by the subregion for security access control in the subregion and for managing badges worn by personnel to access areas;

means for maintaining the information stored in said master database identical to said information stored in each of said regional databases; and means for maintaining the information stored in the regional database of the region having subregional databases identical to the information stored in each of the subregional databases.

39. The system according to claim 20 wherein said information represents first information for access control and second information for managing badges, and at least one of said regional databases is segmented into a plurality of segments each storing different parts of said first information for the region associated with the regional database.

40. The system according to claim 20 wherein at least one of said regional databases represent serves as another one of said master database to other databases in the region associated with said one of said regional databases.

41. The system according to claim 20 further comprising a network capable of providing connection for transfer of data between said master database and each of the regional databases.

42. A method for providing security access control in a plurality of regions in which each region comprises one or more sites having areas to which access is controlled, said method comprising the steps of:

providing a plurality of regional databases in which each of said regional databases is associated with one of said regions and stores information used by the region for security access control in the region and for managing badges worn by personnel to access areas; and providing a master database having information which is initially identical to said information stored in each of said regional databases, wherein each region operates independently of the master database in accordance with the information of their respective regional database.

43. The method according to claim 42 wherein said information stored in each of said regional databases and said master database further comprises system information for maintaining uniformity in each of said regional databases while enabling each region to operates independently of the master database.

44. The method according to claim 42 further comprising the step of maintaining said information stored in said master database identical to said information stored in each of said regional database.

45. The method according to claim 44 wherein said maintaining step further comprises the step of communicating data between said master database and each of said regional databases.

46. The method according to claim 44 wherein said maintaining step further comprises the steps of:

downloading at least a part of the information from said master database to each of said regional databases;

uploading at least a part of the information from each of said regional databases to said master database;

periodically replicating to said master database from each of said regional databases changes in the part of said information stored at the regional database for security access control; and periodically uploading to said master database from each of said regional databases changes in the part of said information stored at the regional database for managing badges.

47. The method according to claim 44 further comprising the step of distributing from each of said regional databases to other of said regional databases through said master database changes in the information stored at said one of regional databases for managing badges.

48. The method according to claim 42 wherein one of said regions represents a portable badging system having a database representing the regional database of one of said regions which does not stores information used for security access control.

49. The method according to claim 42 wherein said information represents first information for access control and second information for managing badges, and said method further comprises the step of segmenting at least one of said regional databases into a plurality of segments each storing different parts of said first information for the region associated with the regional database.

50. The method according to claim 42 wherein at least one of said regional databases represent serves as another one of said master database to other databases in the region associated with said one of said regional databases.

51. A system for managing badges worn by personnel for security access control in a plurality of regions in which each region comprises one or more sites having areas to which access is controlled, said system comprising:

a plurality of regional databases in which each of said regional databases is associated with one of said regions and stores information used by the region for managing badges worn by personnel to access areas of any of the regions;

a master database having information which is initially identical to said information stored in each of said regional databases; and means for uploading from each of said regional databases to said master database any additions, modifications, or deletions in said information of said regional database.

52. The system according to claim 51 further comprising:

means for downloading from said master database to each of said regional databases information in accordance with any additions, modifications, or deletions in said information uploaded to said master database from other regional databases.

53. A system for providing security access control in a plurality of regions in which each region comprises one or more sites having areas to which access is controlled, said system comprising:

a plurality of regional databases in which each of said regional databases is associated with one of said regions and stores information used by the region for security access control in the region;

a master database which stores information initially identical to said information stored in each of said regional databases; and means for uploading to said master database information from each of said regional databases to provide said stored information at said master database.

54. The system according to claim 53 further comprising:

means for uploading from each of said regional databases to said master database any additions, modifications, or deletions in said information of said regional database to assure that the information stored at said master database is identical to the access control information stored at said regional database.

55. A system for controlling access in a plurality of regions in which each region comprises one or more sites having areas to which access is controlled and readers associated with said areas for obtaining access requests to said areas, said system comprising:

a master database for storing at least cardholder information for the system;

a plurality of regional databases in which each of said regional databases is associated with one of said regions for storing at least cardholder information for the system, and access control information for the region;

means for uploading from each of said regional databases to said master database any changes in said cardholder information of said regional database to enable the cardholder information stored at said master database to be identical to the cardholder information stored at said regional database;

means for downloading from said master database to each of said regional databases cardholder information in accordance with any changes in said cardholder information uploaded to said master database from other regional databases; and a plurality of controllers in each of said regions for controlling access to said areas responsive to access requests from at least one reader associated with each of said controllers; and means connected to said controllers in each of said regions which automatically transmits from said regional database of the region to one or more of said controllers of the region security information to be used by the controllers for controlling access when the downloaded cardholder information affects access to areas of the region.

* * * * *